July 30, 1940.  F. LAUCK  2,209,735
GYROSCOPE
Filed Jan. 19, 1939
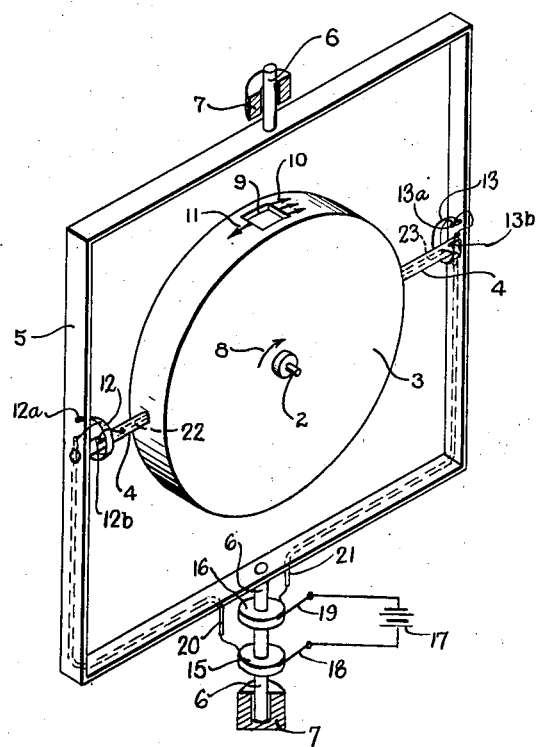
INVENTOR.
Friedrich Lauck
BY
Stephen Cerstvik
ATTORNEY.

Patented July 30, 1940

2,209,735

UNITED STATES PATENT OFFICE 2,209,735

GYROSCOPE

Friedrich Lauck, Lubeck-Travemunde, Germany, assignor to Siemens Apparate und Maschinen Gesellschaft mit beschränkter Haftung, Berlin, Germany, a corporation of Germany Application January 19, 1939, Serial No. 251,862
In Germany September 8, 1937

3 Claims. (Cl. 74—5)

This invention relates to gyroscopes and more particularly to precession control means therefor.

A gyro as a rule is suspended in suitable gimbal rings and is thus provided with three degrees of freedom. In connection, for example, with azimuth gyros, the axis of rotation thereof is arranged horizontally but possesses, as is well known, a tendency to angularly move about a horizontal precession axis. In order to prevent this movement, means have been proposed heretofore for creating torsional moments about an axis which is vertical with respect to the two above-mentioned axes, thereby effecting a return precession into the normal position. The means heretofore proposed have employed, for example, a recoil effect of air jets which discharge tangentially from a housing of the gyro through ports arranged on the circumference of the housing in the plane of rotation of the gyro. A torsional moment is thereby created about the axis of the outer gimbal ring, i. e. the above-mentioned vertical axis, if the plane of rotation of the gyro moves out of its normal position in the plane of the gimbal ring. The above means, when used in combination with azimuth gyros mounted upon aircraft, have the effect, when the craft is climbing or gliding, of causing the gyro to precess whereby the axis of rotation, which is arranged in the direction of the craft's longitudinal axis, moves an amount equal to the angle of climb or glide until the plane of rotation is again in the plane of the outer gimbal ring.

In connection with such angular movements of the gyro away from a normal position, caused by a climbing or gliding of the plane, there is created in the bearings of the horizontal trunnions a frictional moment which results in a precession of the gyro around the axis of the outer gimbal ring. Consequently, a compass rose or any apparatus operatively connected to the gimbal ring will be affected by the undesired precession and the control of the craft thereby detrimentally influenced.

Gyros of the above character are preferably driven electrically. The current for the drive must be fed to the device by way of the inner trunnions of the gimbal ring suspension. Devices heretofore proposed for connecting suitable conductors to said trunnions have undesirable resistances and further exercise a detrimental influence on the bearing support of the trunnions by increasing the bearing friction and hence the bearing wear.

One of the objects of the present invention is to provide novel means for connecting a source of electric energy to a gyro suspended in gimbal rings whereby the friction and wear in the bearings of said rings are reduced to a minimum.

Another object of the invention is to provide novel means for compensating for the frictional moments which occur in the trunnions of the mounting of a gyro.

An additional object is to provide novel means which serve not only to compensate for frictional moments which occur in the trunnions of the mounting of a gyro but also as current conductors for the electrical drive of the gyro.

The above and further objects and novel features of the invention will more fully appear from the following detailed description when the same is read in connection with the accompanying drawing. It is to be expressly understood, however, that the drawing is for purposes of illustration only and is not intended as a definition of the limits of the invention, reference for this latter purpose being had to the appended claims.

The single figure of the drawing is a perspective view, with parts broken away, illustrating one embodiment of the present invention.

The embodiment of the invention illustrated comprises an electrically driven azimuth gyro mounted in a conventional gimbal ring mounting and adapted for use especially aboard aircraft for aiding in the course control thereof. The mounting is provided with a vertical or outer pair of trunnions and a horizontal or inner pair of trunnions. Means are provided for creating a torsional moment about the axis of the outer trunnions and also for the creation of torsional moments about the axis of the inner trunnions. The latter means, comprising resilient helical spring members which are operatively connected to said trunnions and to the gimbal frame and serve not only as moment producing means but as current conductors for the gyro.

In the form shown in the figure, a gyro having a shaft 2 is mounted in a housing 3 which is provided with inner gimbal trunnions 4, 4. The latter are normally horizontal and are mounted in a gimbal frame 5 which in turn is supported by normally vertical trunnions 6, 6 resting in bearings 7, 7 which are rigidly attached, for example, to an aircraft upon which the apparatus is mounted. The gyro is thus adapted for three degrees of fredom, i. e. the first degree about the axis of shaft 2, the second about the axis of trunnions 4, 4, and the third about the axis of trunnions 6, 6.

The plane of the gimbal frame 5 during the normal position of the craft is perpendicular with respect to the longitudinal axis of the craft and the plane of rotation of the gyro is normally coincident with the plane of the gimbal frame. The axis of rotation of the gyro is then perpendicular with respect to the plane of the gimbal frame and is disposed in the direction of said longitudinal axis of the craft. Consider the direction of rotation to be as indicated by arrow 8.

Upon the periphery of housing 3, for a purpose to appear later, there is provided an opening 9 through which an air current indicated by arrows 10 discharges in a tangential direction, the current being produced by a blower effect of the rotating gyro. The force supplied by the recoil effect of the discharging air jet is represented by a vector 11. This vector is opposite to the discharging air jet and likewise directed tangentially with respect to the circumference of the gyro.

In connection with the embodiment shown, assume that the gyro has been deflected from its normal position and that the plane of rotation is at an angle $\alpha$ relative to the plane of the gimbal frame 5. The vector 11, in the normal position of the gyro, lies in the plane of said frame and passes through the axis of the trunnions 6, 6; however, in a deflected position the vector has a lever arm which is a function of the sine of $\alpha$, angle of deflection, and which produces a torsional moment about the axis of trunnions 6, 6 which is also a function of the sine of the angle of deflection. This moment tends to restore the plane of rotation to the initial normal position by causing the gyro to precess in that direction.

A serious source of error in apparatus of this character exists due to friction in the bearings of the trunnions 4, 4, which occurs when the gyro moves away from its normal position. Bearing friction moments are produced which cause the gyro to precess in azimuth and to angularly shift, for example, a compass rose (not shown) operatively connected to the trunnions 6, 6, thereby detrimentally influencing the course control of the aircraft. Novel means are therefore provided for compensating for the bearing friction moments comprising devices for creating torsional compensating moments about the axis of trunnions 4, 4, the compensating moments being of the same order of magnitude as the frictional moments. In this manner, the deflection or precession of the gyro due to this cause is eliminated. The novel means are constituted, in the form shown, by coil springs 12 and 13 which are each secured at one extremity to the gimbal frame 5 and at the other to one of the trunnions 4, 4. Coil spring 12 resiliently urges the trunnions in a counter-clockwise direction whereas spring 13 resiliently acts upon the trunnions in the opposite direction, when viewing the apparatus from the left of the figure.

In operation, if the gyro, due to frictional moments in said bearing, tends to precess about the vertical trunnions 6, 6, the torsional moments produced by the springs 12 and 13 counteract the frictional moments and prevent the precession.

The torsional moments produced by the coil springs are a function of the distortion of the springs. The frictional moments existing in the bearings of the horizontal trunnions, however, are generally uniform. It is therefore advisable to select coil springs having a resiliency which will produce a moment sufficiently large to compensate for bearing friction at a predetermined angular deflection of the plane of rotation relative to the plane of the gimbal frame 5.

The coil springs offer a further considerable advantage concerning the electric drive of the gyro. While it has been heretofore necessary, as mentioned above, to feed the current for the gyro through the bearings of the inner trunnions 4, 4 which results in numerous drawbacks, it is now possible to avoid this necessity and to feed the current for the gyro through the means for producing the compensating torsional moments about the trunnions 4, 4, i. e. in the form shown, through coil springs 12 and 13.

The means for feeding current for the gyro armature in this manner may comprise a pair of slip-rings 15, 16 which are mounted upon the outer gimbal trunnion 6 suitably insulated therefrom and receiving current from a source 17 by means of brushes 18, 19 cooperating with the slip-rings.

Leads 20 and 21 are electrically connected with the slip-rings and conduct current to the exterior ends of torsional springs 12 and 13. The leads may extend along the gimbal rings or may be led through the ring by way of grooved passages formed in the latter. It is to be understood that the leads are properly insulated from the gimbal ring and that the exterior ends of springs 12 and 13 are connected to the gimbal ring by way of suitably insulated portions 12a and 13a.

The opposite or interior ends of springs 12 and 13 are connected to inner trunnion 4 by suitably insulated end portions 12b and 13b. The springs act as conductors for the current from source 17 and convey the current to the armature of the gyro rotor by means of insulated leads 22 and 23 connected thereto which are led through a channel or passage-way in the trunnion 4 or may, if desired, extend along the outside of the trunnion to the housing. In this manner the torsional springs 12 and 13 serve a two-fold purpose in that they overcome moments due to friction bearing and simultaneously act as conductors of current for the gyroscope armature.

There is thus provided a novel means for preventing a precession of a gyro due to frictional moments occurring in trunnion bearings of a mounting therefor. The novel means serve the dual purpose of acting on one hand as a device for producing torsional moments for compensating the above frictional moments and on the other hand as conductors for the current for the electrically driven gyro. Consequently, the bearings of trunnions 4, 4 need not be of a special variety to permit the passage of current therethrough. Furthermore, the frictional resistances are considerably reduced and the life of the trunnion bearings thereby prolonged.

Although only one embodiment of the present invention has been illustrated and described in detail, it is to be expressly understood that the same is not limited thereto. Various changes may also be made in the design and arrangement of the parts without departing from the spirit and scope of the invention as the same will now be understood by those skilled in the art. For a definition of the limits of the invention, reference will be had primarily to the appended claims.

What is claimed is:

1. The combination with an electrically driven gyro having a gimbal ring mounting with inner trunnions and outer trunnions, of means for producing torsional moments about said outer trunnions, and means associated with said gimbal ring and said inner trunnions for producing torsional moments about said inner trunnions, said last-named means comprising electrical current conducting members for conducting current to said gyro.

2. The combination with an electrical gyro in a mounting providing the gyro with three degrees of freedom, said mounting comprising a gimbal ring having inner and outer trunnions, said gyro being mounted in said inner trunnions, means for producing torsional moments about the outer trunnions upon movement of said gyro relative to a predetermined position, and a pair of yieldingly flexible means secured to said gimbal ring and said inner trunnions for producing torsional moments about the latter trunnions to overcome the bearing friction of the latter during movement of said gyro from its predetermined position, said yielding means constituting electrical conductors for conducting current to said gyro.

3. The combination with an electrical gyro in a mounting providing the gyro with three degrees of freedom, said mounting comprising a gimbal ring having inner and outer trunnions, said gyro being mounted in said inner trunnions, and flexible means connecting said inner trunnions and said gimbal ring for producing torsional moments about the inner trunnions, said flexible means constituting electrical current conducting members for conducting current to said gyro.

FRIEDRICH LAUCK.